US010644981B2

(12) United States Patent
Chen et al.

(10) Patent No.: US 10,644,981 B2
(45) Date of Patent: May 5, 2020

(54) SCALING PROCESSING SYSTEMS

(71) Applicant: HEWLETT PACKARD ENTERPRISE DEVELOPMENT LP, Houston, TX (US)

(72) Inventors: Yuan Chen, Palo Alto, CA (US); Dejan S. Milojicic, Palo Alto, CA (US); Jack Yanxin Li, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 287 days.

(21) Appl. No.: 15/625,172

(22) Filed: Jun. 16, 2017

(65) Prior Publication Data
US 2018/0367581 A1 Dec. 20, 2018

(51) Int. Cl.
H04L 29/06 (2006.01)
H04L 29/08 (2006.01)
H04L 12/26 (2006.01)
H04L 12/24 (2006.01)

(52) U.S. Cl.
CPC .......... *H04L 43/16* (2013.01); *H04L 41/0896* (2013.01); *H04L 43/0817* (2013.01); *H04L 67/025* (2013.01); *H04L 67/34* (2013.01)

(58) Field of Classification Search
CPC ..... H04L 65/1093; H04L 67/34; H04L 43/16; H04L 65/80; H04L 67/025
See application file for complete search history.

(56) References Cited

U.S. PATENT DOCUMENTS

| 8,074,107 B2 | 12/2011 | Sivasubramanian et al. |
| 2010/0122065 A1* | 5/2010 | Dean ................ G06F 9/4881 712/203 |
| 2010/0325621 A1* | 12/2010 | Andrade ............ G06F 8/433 717/156 |
| 2011/0213802 A1* | 9/2011 | Singh ............... G06F 16/2465 707/774 |
| 2013/0152047 A1 | 6/2013 | Moorthi et al. |
| 2013/0297802 A1* | 11/2013 | Laribi .............. H04L 12/6418 709/226 |
| 2014/0081896 A1* | 3/2014 | Ranganathan ........ G06N 5/02 706/48 |
| 2015/0149507 A1* | 5/2015 | Imaki .............. G06F 16/24568 707/798 |
| 2015/0180724 A1 | 6/2015 | Varney et al. |

(Continued)

OTHER PUBLICATIONS

Amazon Web Services, Inc., "Performance Efficiency Pillar," Nov. 2016, pp. 1-37.

(Continued)

*Primary Examiner* — Nicholas R Taylor
*Assistant Examiner* — Sanjoy K Roy
(74) *Attorney, Agent, or Firm* — Hewlett Packard Enterprise Patent Department

(57) ABSTRACT

Example implementations relate to scaling a processing system. An example implementation includes receiving an application having a number of operators for performing a service in the processing system. A metric of the processing system may be monitored while the application runs, and the processing system may be scaled where the metric surpasses a threshold. In an example, the processing system may be scaled by increasing or decreasing the number of operators of the application.

17 Claims, 8 Drawing Sheets

(56) References Cited

U.S. PATENT DOCUMENTS

| | | | |
|---|---|---|---|
| 2015/0254094 A1* | 9/2015 | Cao | G06F 16/24568 718/1 |
| 2015/0256482 A1* | 9/2015 | Bragstad | H04L 43/04 709/219 |
| 2017/0168748 A1* | 6/2017 | Barsness | G06F 16/24568 |

OTHER PUBLICATIONS

Bugra Gedik et al., "Elastic Scaling for Data Stream Processing," IEEE Transactions on Parallel and Distributed Systems, Jun. 2014, pp. 1447-1463, vol. 25, No. 6.

Charith Wickramaarachchi et al., "Real-time Analytics for Fast Evolving Social Graphs," 2015, pp. 1-6.

Jan Sipke Van Der Veen et al., "Dynamically Scaling Apache Storm for the Analysis of Streaming Data," 2015 IEEE First International Conference on Big Data Computing Service and Applications, Mar. 2015, pp. 154-161, IEEE.

Mansheng Yang and Richard T.B. Ma, "Smooth Task Migration in Apache Storm," SIGMOD'15, May 31-Jun. 4, 2015, Melbourne, Australia, pp. 2067-2068, ACM.

Muhammad Anis Uddin Nasir et al., "When Two Choices Are Not Enough: Balancing at Scale in Distributed Stream Processing," Jan. 27, 2016, pp. 1-12.

Raul Castro Fernandez et al., "Scalable and Fault-Tolerant Stateful Stream Processing*," Imperial College Computing Student Workshop (ICCSW'13), 2013, pp. 11-18, Dagstuhl Publishing, Germany.

Scott Schneider et al.,"Elastic Scaling of Data Parallel Operators in Stream Processing," Proceedings of the 2009 IEEE International Symposium on Parallel & Distributed Processing, IPDPS '09, 2009, pp. 1-12, IEEE Computer Society.

Xing Wu, "Dynamic Load Balancing and Autoscaling in Distributed Stream Processing Systems," Thesis, Apr. 2015, pp. 1-95, Concordia University, Canada.

\* cited by examiner

SCALING PROCESSING SYSTEMS

BACKGROUND

Applications may utilize data that is processed in real time, such as dynamic content delivery and security event analysis. The rate at which application services are requested may vary drastically over time. A system may be scaled to match the varying demand for these application services.

BRIEF DESCRIPTION OF THE DRAWINGS

The following detailed description references the drawings, wherein.

DETAILED DESCRIPTION

Figure 1:
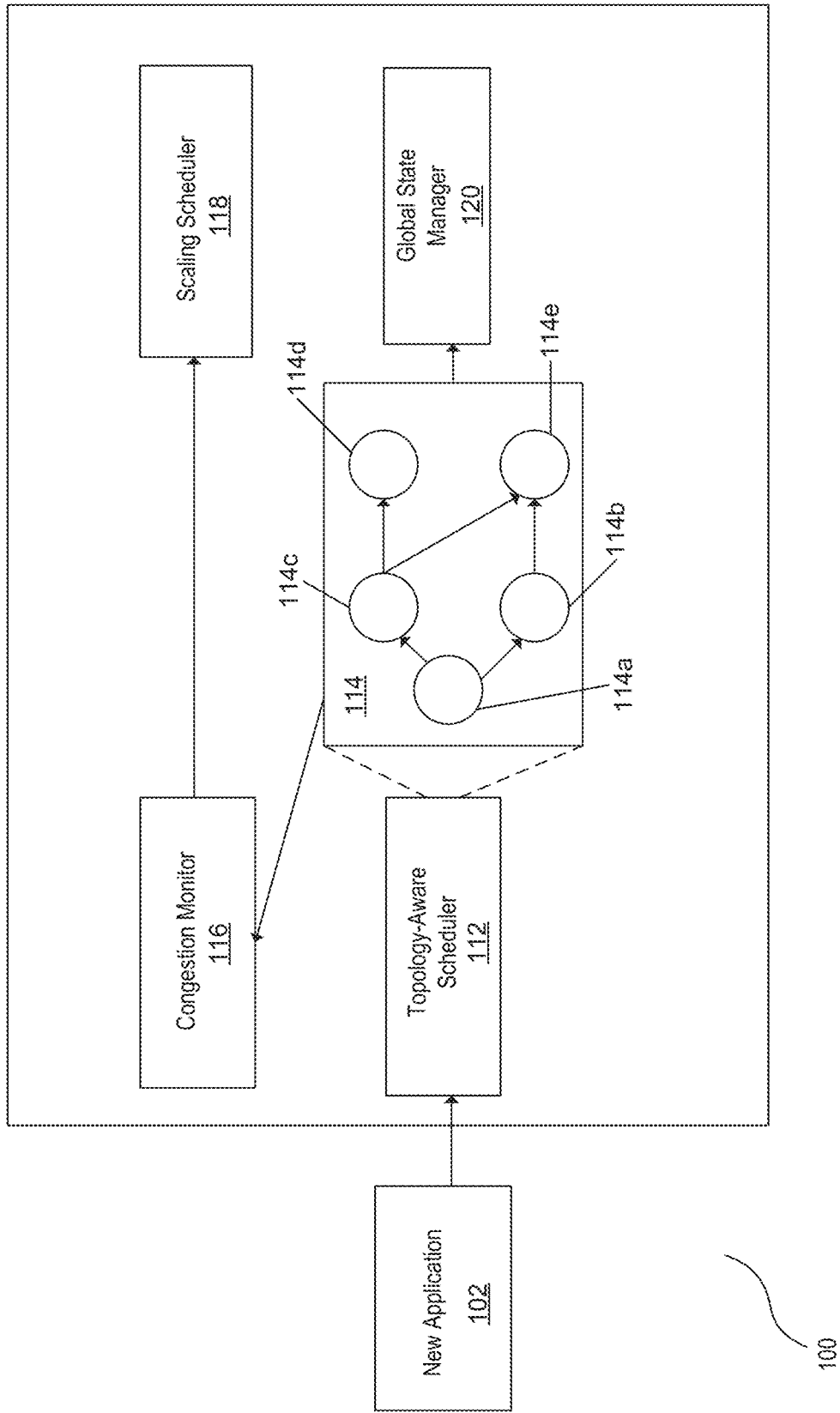
FIG. 1 is a block diagram of an example data stream processing system 100 for elastic scaling.

The input rate of data for application services may be dynamic such that the demand for application services may vary over time. Resources and/or operators of a processing system may be designated to process data input to an application in real time. Where the demand on an application increases, the system may suffer from latency and/or other bottlenecks due to a lack of computational resources and/or operators for processing. Conversely, where the demand on an application decreases, too many resources and/or operators may be designated for processing of application services such that the designated resources and/or operators are utilized inefficiently. To ensure that an appropriate number of computational resources and/or operators are designated for the processing of input data of an application, an elastic system to dynamically scale to match the dynamic demands for application services may be implemented.

The number of resources within a processing system, operators within a processing system, or any combination thereof may be scaled. Resources of a processing system may include physical machines, virtual machines, containers, etc. which provide CPUs, memory, and/or networking resources for processing. Operators may be software components such as programs, processes, threads, etc., used to compute resources for data processing.

Applications may be scaled in a stateful manner, i.e., the resources and/or operators dedicated to an application for processing may be increased or decreased. Prior to scaling, an application state may be saved, and, after scaling, the stored application state may be distributed to existing operators in the system. By utilizing a stateful scaling approach, the loss of data during a scaling operation may be prevented. In an example, consistent hashing may be utilized to scale an application in a stateful manner.

Reference will now be made to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

FIG. 1 is a block diagram of an example processing system 100 for elastic scaling. In an example, system 100 may receive an application for data stream processing. Specifically, system 100 may receive the application at a topology-aware scheduler 112. The topology-aware scheduler 112 may analyze the received application and place operators of the application on a like compute resource such as a physical server, virtual machine, container, etc. In an example, placement of the application operators on like compute resources may account for dependencies between the application operators.

For example, the topology-aware scheduler 112 may map the dependencies of operators of the received application as a directed acyclic graph (DAG), such as DAG 114. DAG 114 is an example graph used to model the connectivity and/or causality between processing elements, i.e. data operators, of the received application. Specifically, example data operators of the received application may be represented by circles 114a-e, and the dependency between the operators, e.g., the application data flow, may be represented by the arrows connecting the operators. For example, data processed by operator 114c may flow to operator 114d and operator 114e. Thus, operator 114d and operator 114e may be said to share a dependency relationship with operator 114c. The DAG may also show for example, that data processed by operator 114b may flow to operator 114e but not to operator 114d. Thus the DAG may show that operator 114e is dependent on operator 114b, but operator 114b and operator 114d have no such dependency relationship.

In an example, the topology-aware scheduler may place operators in memory accounting for dependencies between operators. Specifically, the topology-aware scheduler may co-locate operators such that intercommunication cost, i.e. latency, between operators is minimized. For instance, the topology-aware scheduler may place dependent operators, such as operators 114c and 114d, in closer physical proximity than operators not having a dependency relationship, such as operators 114b and 114d. Operators 114c and 114d, may for example, be prioritized for collocation on a physical machine over operators 114b and 114d.

In stream processing systems, the load on an application operator may be dynamic, and may vary at any given time. As described above, where the demand on an application increases, the system may suffer from latency and/or other bottlenecks due to a lack of resources and/or operators for processing. Conversely, where the demand on an application decreases, too many resources and/or operators may be designated for processing of application services such that the designated resources and/or operators are utilized inefficiently. A congestion monitor, such as congestion monitor 116, may thus be implemented to monitor operator congestion.

Congestion on the application operators may be monitored by a variety of metrics. Congestion monitor 116 may monitor a metric of the processing system while an application runs to determine system congestion. The metric may include any combination of machine system metrics, such as CPU, memory, and/or network utilization; system metrics, such as the rate of input/output queries to the application; and/or application system metrics, such as throughput and/or average latency of the application. In an example, the system may be determined to be congested where congestion monitor 112 detects that a monitored metric, or some combination of monitored metrics, surpasses a predetermined threshold. For instance, where CPU utilization of a machine exceeds 90%, a CPU performance bottleneck may be determined. Additionally, congestion monitor 116 may monitor a metric of the processing system, e.g. one of the aforementioned machine, system and/or application metrics, while an application runs to determine system underutilization. For instance, where CPU utilization of a machine drops below 20%, an underutilization of CPU resources may be determined.

In an example, congestion monitor 116 may determine that the system is congested or underutilized where a monitored metric, or some combination of monitored metrics, is greater than or less than a predetermined threshold for a predetermined period of time. For example, where the average latency experienced by an application is greater than two seconds for a period of twenty seconds or more, the system may be determined to be congested. As another example, where less than 20% of system memory is utilized for a period of one hour or more, the system may be determined to be underutilized. Congestion monitor 116 may trigger a scaling operation where system congestion or system underutilization is detected.

Where a scaling operation is triggered, a scaling scheduler, e.g. scaling scheduler 118, may increase or decrease the number of operators of the application for performing a service, and/or increase or decrease the number of computational resources for performing the service. Where the system experiences congestion in the form of resource bottlenecks, new machines may be added to the system and/or the parallelism of operators in the system may be increased. For example, where one or more machine and/or system metrics are determined to be congested, the number of machines dedicated to the application may be increased. Where a number of requests for performing an application service surpasses a threshold, i.e. a request queue for performing an application service surpasses a threshold, and the one or more machine and/or system metrics are determined not to be congested, the parallelism of operators in the system may be increased. In other words, additional operators for processing data corresponding to requests in the queue may be dedicated to the application. In an example, the added additional operators may perform duplicative functionality as the operators already dedicated to process service requests for the application, e.g. operators 114a-e.

Conversely, where system resources are underutilized, machines in the system may be removed and/or the parallelism of operators in the system may be decreased. Where the system, e.g. congestion monitor 116, determines that the system is underutilized, machines may be removed from the system and/or the parallelism of operators in the system may be decreased. For example, where one or more machine and/or system metrics are determined to be underutilized, and/or the request queue for performance of application services is empty or drops below a threshold, the number of machines dedicated to the application may be decreased. Where a number of requests for performing an application service drops below a threshold, i.e. a request queue for performing an application service drops below a threshold, but the one or more machine and/or system metrics are determined not to be underutilized, the parallelism of operators in the system may be decreased. In other words, operators for processing data corresponding to requests in the queue may be removed from application processing. In an example, the removed operators perform duplicative functionality as operators already dedicated to process service requests for the application, e.g. operators 114a-e.

Prior to scaling the system, the states and/or data of the operators may be stored in a global state manager, e.g. global state manager 120. Global state manager 120 may store data of the application operators prior to scaling, and, once the scaling process is complete, may repartition the data stored in the global state manager. In an example, the data may be compressed prior to storing the data in the global state manager, e.g. using a fast in-place algorithm. In an example, the data stored in the global state manager may be repartitioned and allocated to the operators dedicated for application processing.

Figure 2:
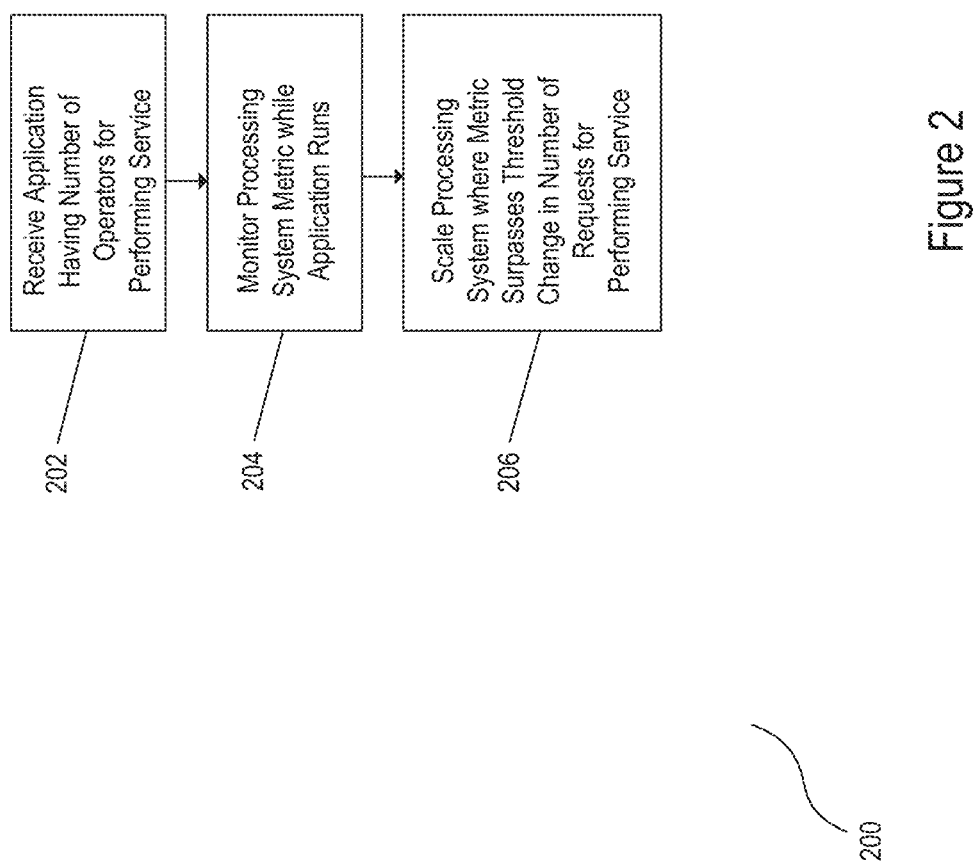
FIG. 2 is a flowchart depicting an example method 200 for elastic scaling of a processing system.

FIG. 2 is a flowchart depicting an example method 200 for elastic scaling of a processing system. Method 200 may be executed or performed, for example, by some or all of the system components described above in system 100 of FIG. 1. Method 200 may be implemented in the form of executable instructions stored on at least one machine-readable storage medium of a system and executed by at least one processor of the system. Alternatively or in addition, method 200 may be implemented in the form of electronic circuitry, e.g. hardware. In some examples, steps of method 200 may be executed substantially concurrently or in a different order than shown in FIG. 2. In some examples, method 200 may include more or less steps than are shown in FIG. 2. In some examples, some of the steps of method 200 may, at certain times, be ongoing and/or may repeat.

At block 202, an application may be received by a processing system. The application may have a number of operators for performing a service. The application may be received, for example, by topology-aware scheduler 112 of FIG. 1. Additionally, the service of the application may utilize computational resources of the processing system.

At block 204, a metric of the processing system may be monitored while the application runs. The processing system may be monitored, for example, by congestion monitor 116 of FIG. 1. Any number and any combination of metrics of the processing system may be monitored. A monitored metric may be specific to the processing system, specific to a machine on which the processing system runs, or specific to the received application. For instance, machine system metrics, such as CPU, memory, and/or network utilization; system metrics, such as the rate of input/output queries to the application; and/or application system metrics, such as throughput and/or average latency of the application, may be monitored. In an example, the processing system may be determined to be congested where a monitored metric, or some combination of monitored metrics, surpasses a predetermined threshold.

The processing system may be scaled, e.g. by scaling scheduler 118 of FIG. 1, where the metric of the processing system surpasses a threshold change in the number of requests for performing the service. Surpasses as described herein may include a metric being greater than a threshold or less than a threshold. In an example, the threshold change in the number of requests for performing the service may be based on a predetermined percentage increase or decrease and/or rate increase or decrease of requests within a given period of time.

Figure 3:
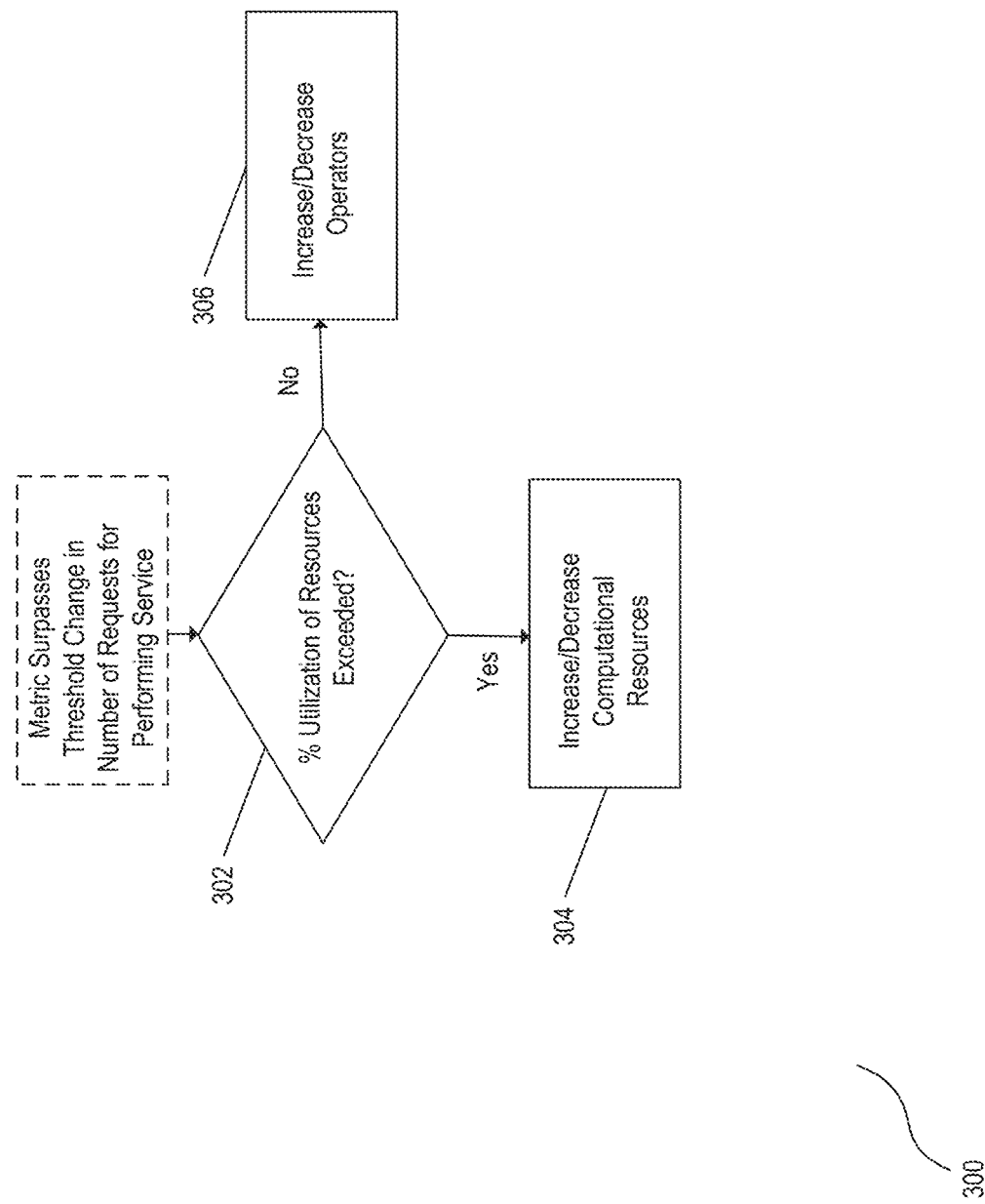
FIG. 3 is a flowchart depicting another example method 300 for scaling a processing system.

FIG. 3 is a flowchart depicting an example method 300 for scaling a processing system. Method 300 may be executed or performed, for example, by some or all of the system components described above in system 100 of FIG. 1. Method 300 may be implemented in the form of executable instructions stored on at least one machine-readable storage medium of a system and executed by at least one processor of the system. Alternatively or in addition, method 300 may be implemented in the form of electronic circuitry, e.g. hardware. In some examples, steps of method 300 may be executed substantially concurrently or in a different order than shown in FIG. 3. In some examples, method 300 may include more or less steps than are shown in FIG. 3. In some examples, some of the steps of method 300 may, at certain times, be ongoing and/or may repeat.

Method 300 further describes an example process for scaling a processing system as illustrated at block 206 of FIG. 2. For example, where the monitored metric surpasses a threshold change in the number of requests for performing a service, it may be determined at block 302 whether a percentage utilization of computational resources for performing the service was exceeded. A determination that a percentage utilization of computational resources is exceeded may suggest that resource congestion or an under-utilization of resources exists within the processing system and may be followed, at block 304, by an increase or decrease in the number of computational resources for performing the service. Where the percentage utilization of computational resources utilized by the service is not exceeded however, the number of operators of the application for performing the service may be increased or decreased at block 306. Thus, the processing system may be scaled to account for any resource bottleneck and/or operator bottleneck.

Figure 4:
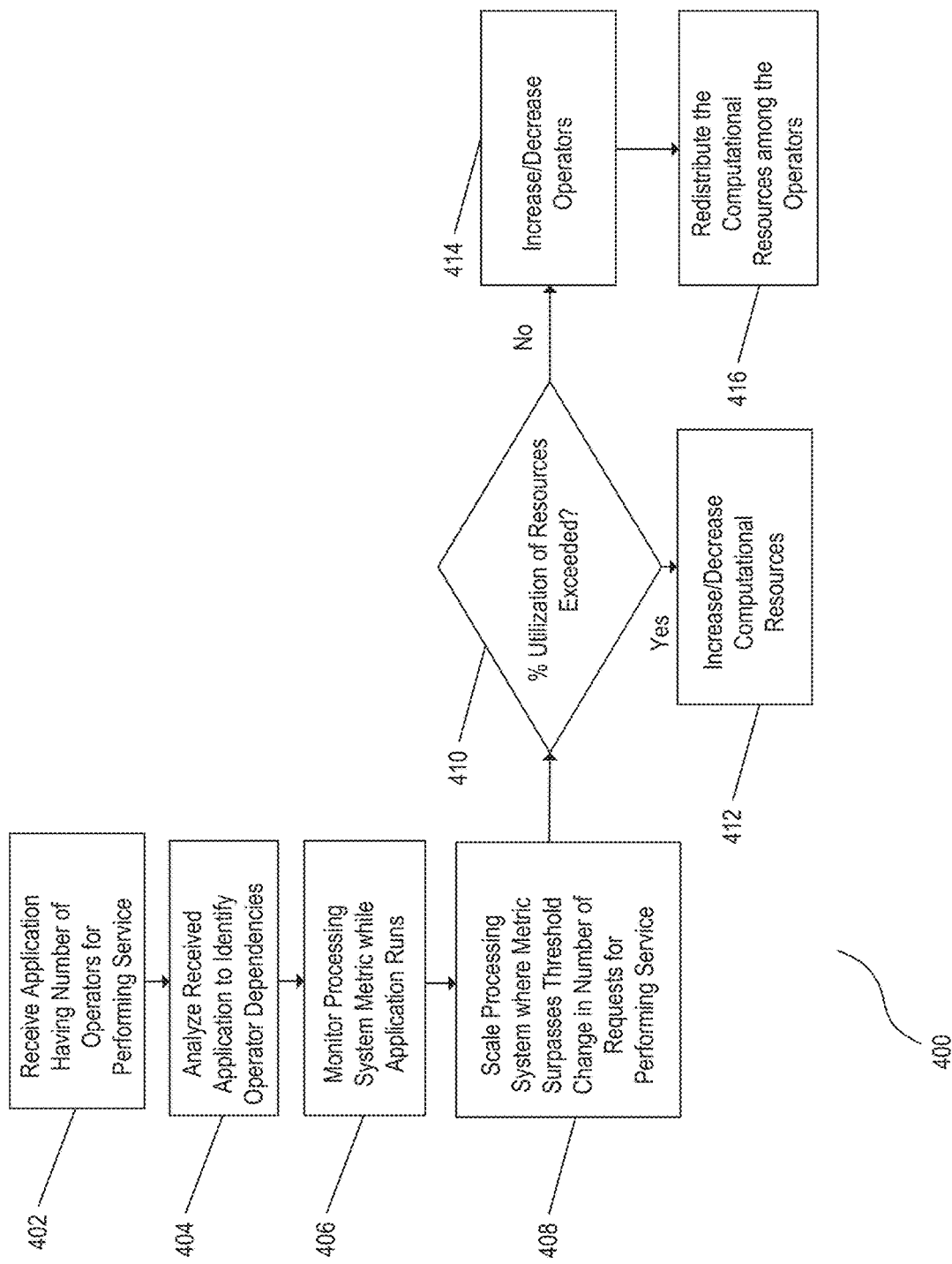
FIG. 4 is a flowchart depicting another example method 400 for scaling a processing system.

FIG. 4 is a flowchart depicting another example method 400 for scaling a processing system. Method 400 may be executed or performed, for example, by some or all of the system components described above in system 100 of FIG. 1. Method 400 may be implemented in the form of executable instructions stored on at least one machine-readable storage medium of a system and executed by at least one processor of the system. Alternatively or in addition, method 400 may be implemented in the form of electronic circuitry, e.g. hardware. In some examples, steps of method 400 may be executed substantially concurrently or in a different order than shown in FIG. 4. In some examples, method 400 may include more or less steps than are shown in FIG. 4. In some examples, some of the steps of method 400 may, at certain times, be ongoing and/or may repeat.

At block 402, an application may be received by a processing system. The application may have a number of operators for performing a service. The application may be received, for example, by topology-aware scheduler 112 of FIG. 1. Additionally, the service of the application may utilize computational resources of the processing system.

In an example, operators of the received application may be placed within memory such that intercommunication cost between the operators is minimized. At block 404, the received application may be analyzed to identify operator dependencies. Specifically, the processor may analyze the received application by mapping the application as a directed acyclic graph (DAG) of its operators to identify dependencies of the application operators. By mapping the operator dependencies, intercommunication cost between the operators may be minimized by placing operators of the application having identified dependencies in closer physical proximity within memory than operators having no such dependency relationship.

At block 406, a metric of the processing system may be monitored while the application runs. Any number and any combination of metrics of the processing system may be monitored. A monitored metric may be specific to the processing system, specific to a machine on which the processing system runs, and/or specific to the received application. For instance, machine system metrics, such as CPU, memory, and/or network utilization; system metrics, such as the rate of input/output queries to the application; and/or application system metrics, such as throughput and/or average latency of the application, may be monitored. In an example, the processing system may be determined to be congested where a monitored metric, or some combination of monitored metrics, surpasses a predetermined threshold.

The processing system may be scaled, e.g. by scaling scheduler 118 of FIG. 1, where the metric of the processing system surpasses a threshold change in the number of requests for performing the service. In an example, the threshold change in the number of requests for performing the service may be based on a predetermined percentage increase or decrease and/or rate increase or decrease of requests within a given period of time.

To determine which scaling operation may be performed, it is determined at block 410 whether a percentage utilization of resources is exceeded. Where a percentage utilization of resources surpasses a threshold, the computational resources of the processing system may be increased or decreased. Specifically, where the percentage utilization of resources is lower than a threshold, the computational resources of the processing system may be decreased, and where the percentage utilization of resources is greater than a threshold, the computational resources of the processing system may be increased. Conversely, where the percentage utilization of resources does not surpass a threshold, parallelism of an operation, i.e. the number of operators dedicated to performing a service of the application, may be increased or decreased. The data may then be redistributed among the operators at block 416 as will be further described below.

Figure 5:
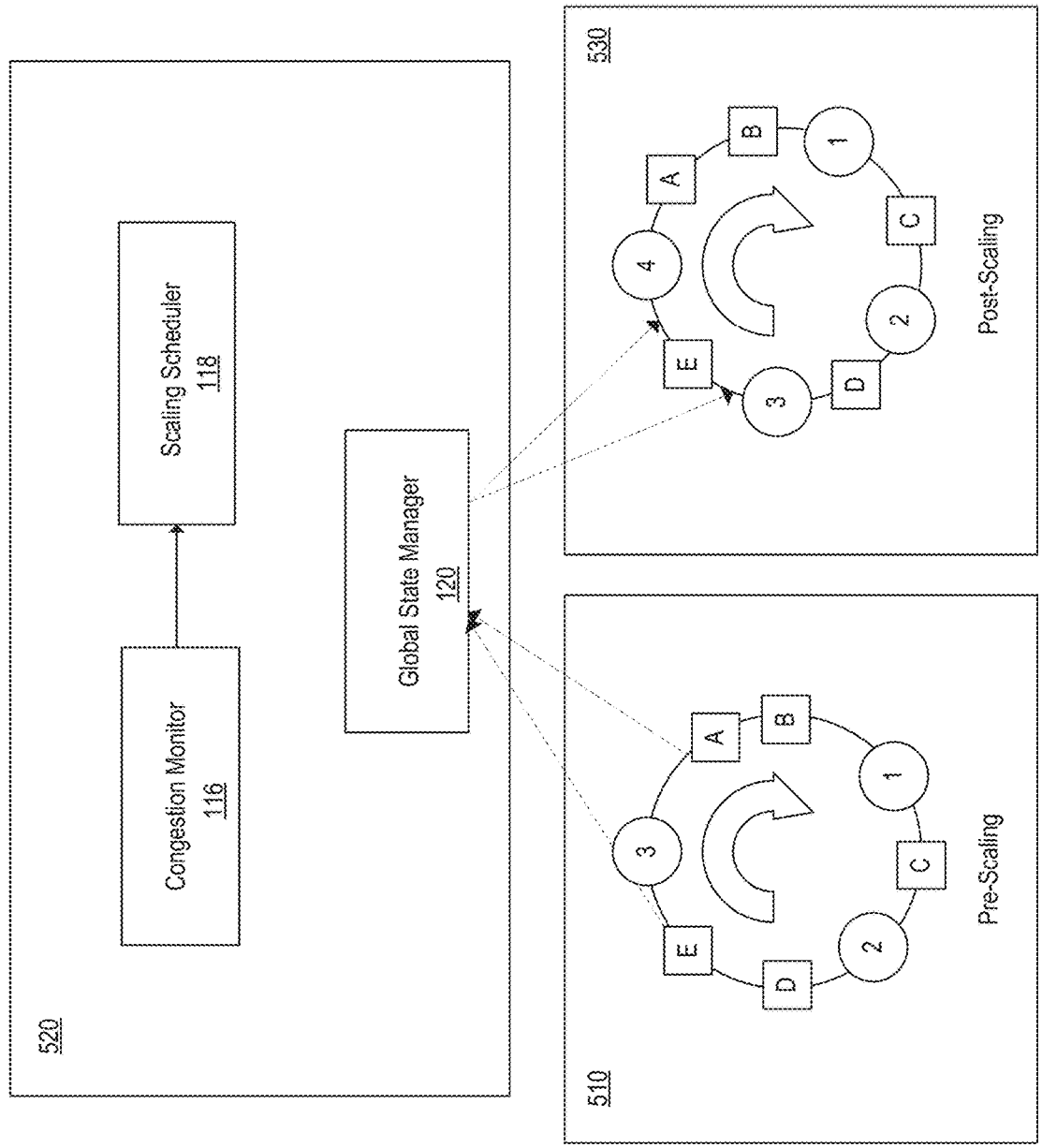
FIG. 5 is a block diagram illustrating an example processing system for redistributing data among operators after scaling the processing system.

FIG. 5 is a block diagram illustrating an example processing system for redistributing data among operators after scaling the processing system. System 500 may include similar architecture to that of system 100. For clarity and conciseness, some of the components of system 500 may be described with reference to system 100 of FIG. 1, including congestion monitor 116, scaling scheduler 118, and global state manager 120. As described above, congestion monitor 116 may monitor a metric of the processing system while the application runs, and scaling scheduler 118 may scale the processing system where the metric of the processing system surpasses a threshold.

Global state manager 120 may be provided to store data of the application operators in a stateful manner where the metric of the processing system surpasses a threshold. Pre-scaling representation 510 illustrates a state of operators prior to scaling to be stored in global state manager 120. Specifically, pre-scaling representation 510 illustrates example operators 1, 2, and, 3, as well as example data objects A-E to be processed by operators 1-3. Post-scaling representation 510 illustrates an example state in which data of type A and data of type B are dedicated to be processed by operator 1, data of type C is dedicated to be processed by operator 2, and data of type D and E are dedicated to be processed by operator 3. While three example operators and five example data objects are illustrated in FIG. 5, any number of operators may be implemented and data may be partitioned and dedicated to be processed in any number of ways.

Global state manager 120 may repartition the data stored in global state manager 120. For instance, a scaling operation may be performed, e.g. by scaling scheduler 118, such that the number of operators dedicated to processing a service of the application is increased or decreased. Global state manager 120 may repartition the data stored in global state manager 120 according to the increase or decrease in the number of operators of the application, and, in an example, may allocate the repartitioned data to the operators of the application.

In an example, consistent hashing may be implemented by global state manager 120 when repartitioning and allocating the stored data. Using consistent hashing, the migration of data between operators may be minimized. In an example, a range of hash values may be assigned to each operator and each data object type may be associated with a key. A hash value of each associated key may be computed and matched with the hash value assigned to each operator such that each operator is dedicated to processing any number of data object types.

To illustrate, the hash value of an associated key may be matched with the hash value assigned to an operator by assigning each operator a range of hash values on the ring represented within pre-scaling representation 510. The computed hash value of each key may also correspond with a point on the ring represented within pre-scaling representation 510. The closest hash value corresponding to a point on the ring in the clockwise direction with the computed hash value of a key may indicate the match. Thus, as illustrated in pre-scaling representation 510, the hash of the key assigned to data object A and B may fall in the range of hash values assigned to operator 1, the hash of the key assigned to data object C may fall in the range of hash values assigned to operator 2, and the hash of the key assigned to data object D and E may fall in the range of hash values assigned to operator 3. Accordingly, data objects A and B may be dedicated for processing by operator 1, data object C may be dedicated for processing by operator 2, and data objects D and E may be dedicated for processing by operator 3.

After the data objects are matched with the operators, the data may be migrated to the operators and the routing paths for the data may be updated. In an example, unprocessed data, e.g. a data object from a new data stream, may also be migrated to a corresponding operator. Where a data object from a new data stream is dedicated for processing by an existing operator, the data object may be re-routed to the corresponding operator upon matching. Where the data object from the new data stream is dedicated for processing by a newly dedicated operator, the data object may be queued until the new operator is instantiated and the existing stored state of the new operator is transferred. Once instantiation completes, the new object may be routed to the new operator.

In this illustrative example, the scaling of the processing system includes increasing the number of operators assigned for processing data objects A-E. Once the processing system is scaled, global state manager 120 may repartition the data stored in the global state manager and allocate the repartitioned data to the application operators. Using consistent hashing, migration of data between operators is minimized. For example, post-scaling representation 530 illustrates the data allocated between the scaled application operators in a minimized fashion. Post-scaling, operator 1 remains dedicated to processing data objects A and B, operator 2 remains dedicated to processing data object C, and operator 3 remains dedicated to processing data object D. Due to the scaling operation and increase in operators, data object E was moved from operator 3 such that new operator 4 is dedicated to process data object E.

While this example illustrated three dedicated example operators prior to scaling and four such operators post-scaling, any number of operators may be employed prior to scaling and post-scaling. Similarly, where five example data objects were illustrated, any number of data objects may be pre-processed by the dedicated operators. Additionally, a consistent hashing approach may be implemented where the number of operators dedicated for processing of the application increases or decreases. In an example, the number of operators deployed may be dependent on the number of consistent hashing ranges implemented.

Data objects dedicated for application processing, e.g. data objects A-E in pre-scaling representation 510 and post-scaling representation 530, may be stored within a shared memory pool. Therefore, the data objects may not be physically moved where allocated to a different operator upon scaling. Each data object in the shared memory pool may be located by a memory pointer that signifies an address of the data object stored within the shared memory pool. Memory pointers may be allocated to the operators such that the data objects are not physically moved and the migration of data upon scaling is further minimized.

Figure 6:
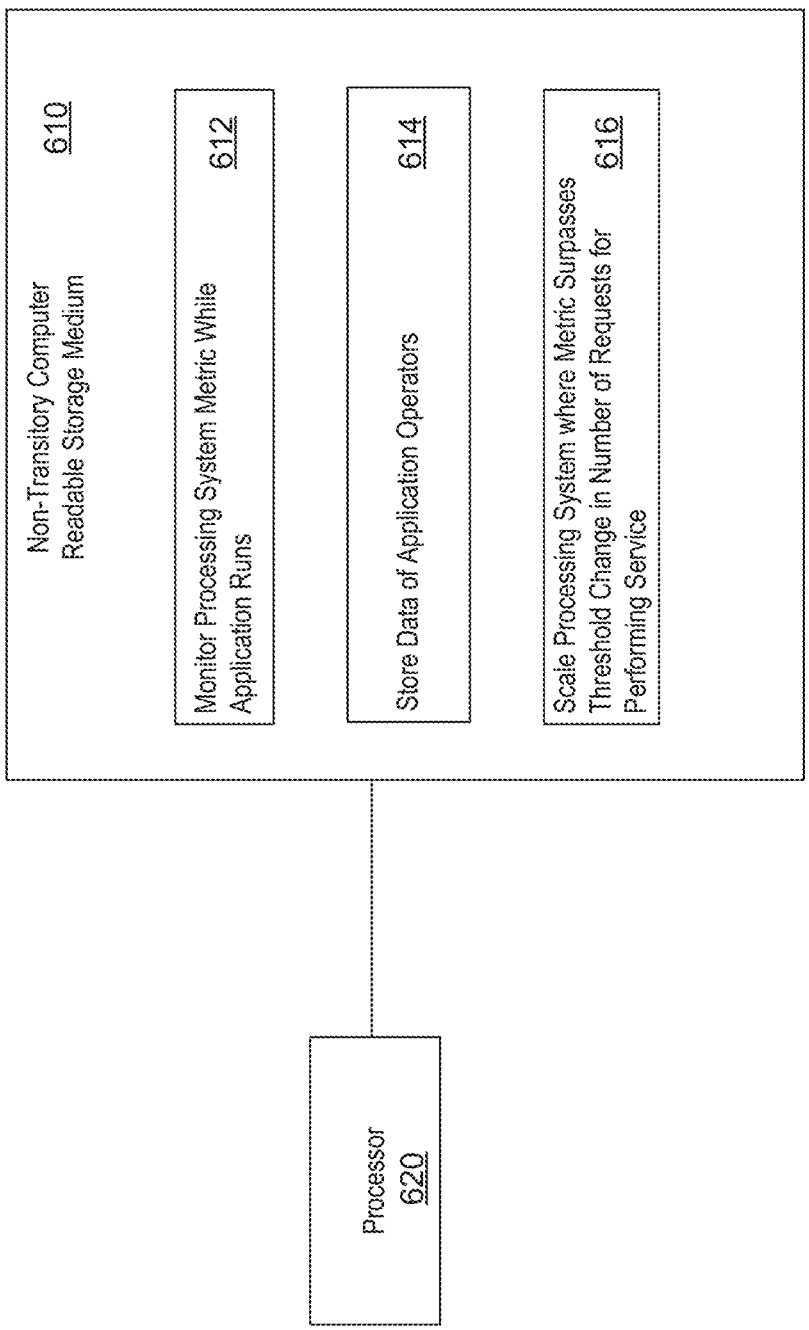
FIG. 6 is a block diagram 600 depicting an example non-transitory computer readable medium for scaling a processing system.

FIG. 6 is a block diagram 600 depicting an example non-transitory computer readable medium 610 for scaling a processing system. Non-transitory computer readable storage medium 610 may be coupled to a processor, e.g. processor 620, and may include executable instructions thereon. Instructions 612, when executed, may cause the processor to monitor a metric of the processing system. Specifically, a metric of the processing system may be monitored while an application having a number of operators for performing a service runs. In an example, the monitored metric of the processing system may be specific to the processing system, specific to a machine on which the processing system runs, and/or specific to the application received by the processing system.

Instructions 614 may further be provided to store data of the application operators to a global state manager, e.g. global state manager 120. Global state manager 120 may store the application operators in a stateful manner, such that dedications of the operators for processing of particular data objects are preserved. Once the data of the application operators is stored, the processing system may be scaled. Instructions 616 may be provided to scale the processing system where a metric surpasses a threshold change in a number of requests for performing a service.

Figure 7:
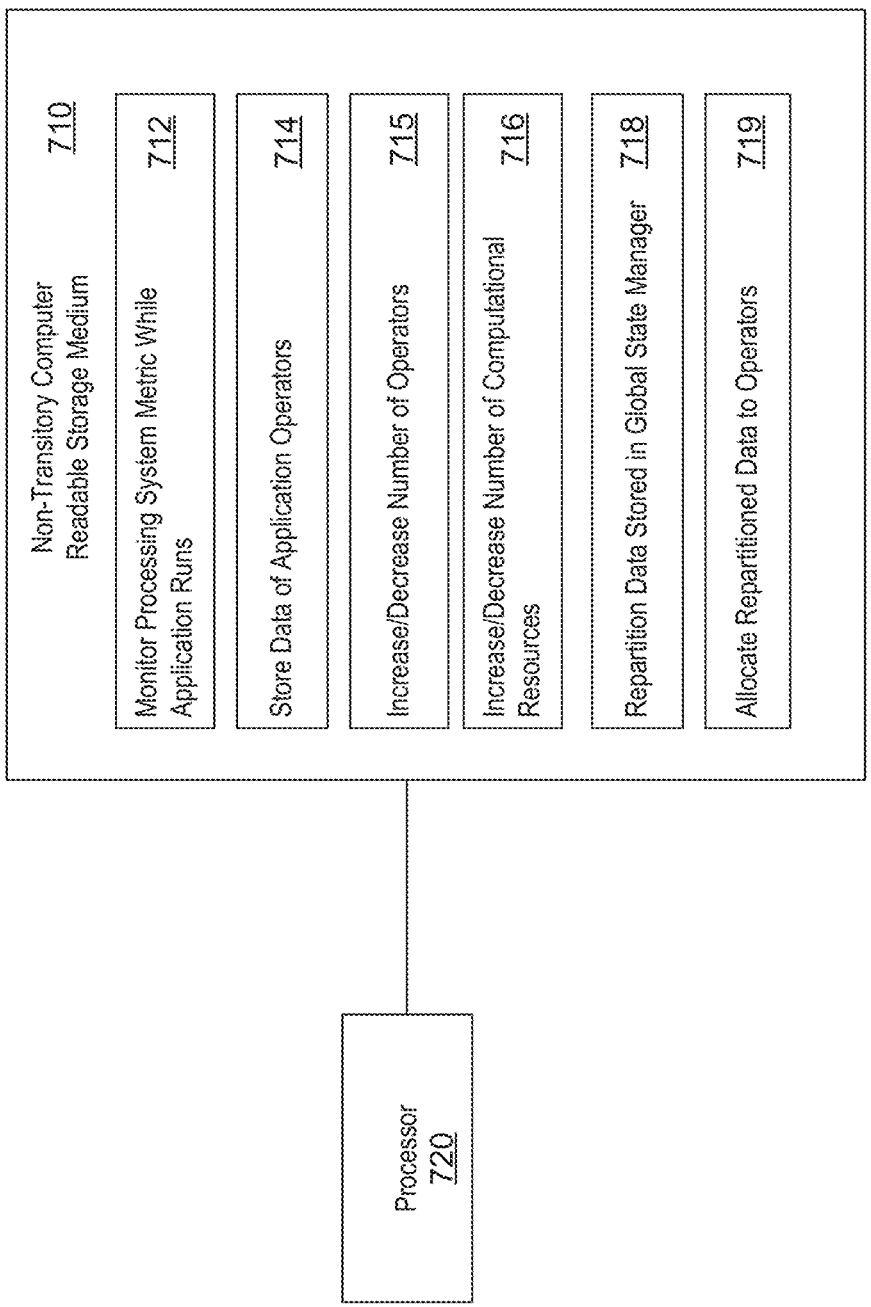
FIG. 7 is a block diagram 700 illustrating another example non-transitory computer readable medium for scaling a processing system.

FIG. 7 is a block diagram 700 illustrating another example non-transitory computer readable medium 710 for scaling a processing system. Non-transitory computer readable medium 710 may be coupled to a processor, e.g. processor 720, and may include executable instructions thereon. Non-transitory computer readable medium 710 may include similar instructions to that of non-transitory computer readable medium 610 of FIG. 6. For example, instructions 712 and 714 of FIG. 7 may correspond with instructions 612 and 614 of FIG. 6. Instructions 616 of FIG. 6 may be carried out by instructions 715, instructions 716, instructions 718, and instructions 719 of FIG. 7. Specifically, instructions 715, instructions 716, instructions 718, and instructions 719 may be provided for scaling the processing system. Instructions 715 may be provided to increase or decrease the number of operators for processing a service of the application. In an example, the number of operators of the application for performing the service may be increased or decreased responsive to a threshold change in the number of requests for performing the service in the processing system. In another example, the number of operators of the application for performing the service may be increased or decreased responsive to a threshold change in the number of requests for performing the service in the processing system and a percentage utilization of computational resources for processing services of the application is not surpassed. Instructions 716 may be provided to increase and/or decrease the number of computational resources available for processing a service of the application where a percentage utilization of computational resources for processing services of the application is surpassed.

Instructions 718 may be provided to repartition the data stored in the global state manager. Instructions 719 may allocate the repartitioned data to the operators. As described above, a consistent hashing mechanism may be used for data allocation, including assigning a hash value to each operator of the application and assigning a key to each data object. Thus, the processing system may be scaled in a stateful manner such that data migration between operators is minimized.

Figure 8:
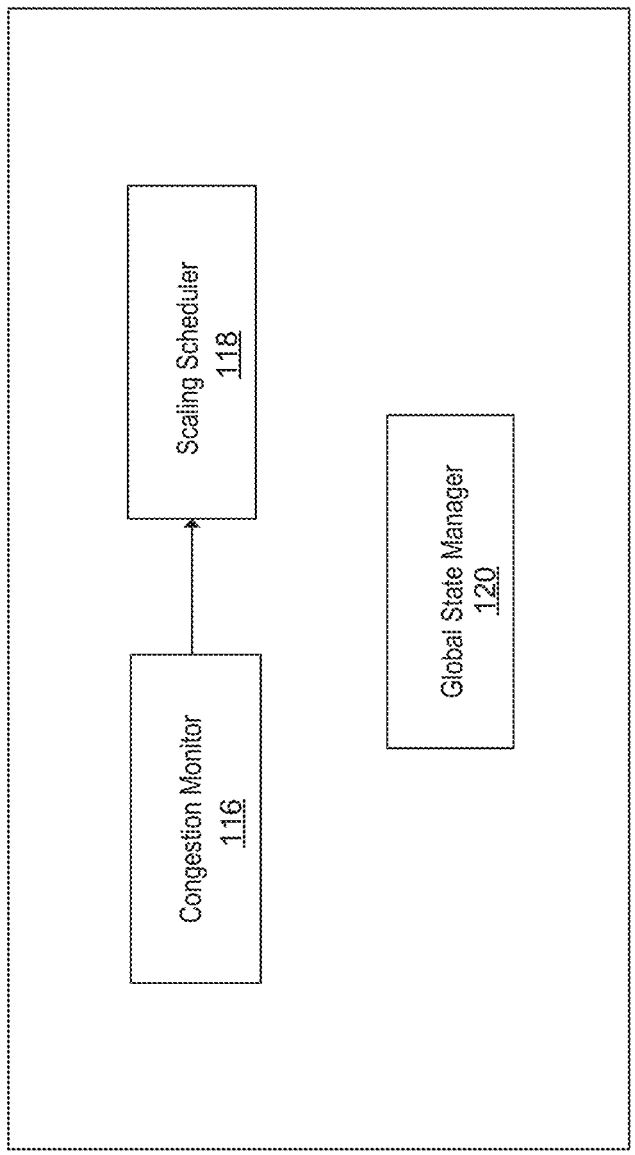
FIG. 8. is another block diagram depicting an example processing system 800 for elastic scaling.

FIG. 8. is another block diagram depicting an example processing system 800 for elastic scaling. FIG. 8 may include similar architecture to that of FIG. 1, including congestion monitor 116, scaling scheduler 118 and global state manager 120. As described above, congestion monitor 116 may be provided for monitoring a metric of the processing system while an application of the processing system runs. Scaling scheduler 118 may be provided for scaling the processing system where the metric of the processing system surpasses a threshold, and global state manager 120 may be provided for storing data of operators of the application, repartitioning data stored in the global state manager according to the increase or decrease in the number of operators of the application after scaling, and allocating the repartitioned data to the operators of the application.

The invention claimed is:

1. A method for elastic scaling of a processing system, the method performed by a processor and comprising:
   receiving an application having a number of operators for performing a service in the processing system, wherein the service utilizes computational resources of the processing system comprising one or more physical machines, virtual machines, containers, or a combination thereof;
   monitoring a metric of the processing system while the application runs; and
   distributing data among the operators of the application, the distribution comprising:
      associating each data object with a key and each operator with a range of hash values within a consistent set of hash values, wherein each operator comprises one of a program, a process, or a thread; and
      mapping the data objects to the operators by computing a hash value of each associated key and matching the computed hash value with a hash value within the range of hash values of each operator; and
   where the metric of the processing system surpasses a threshold change in the number of requests for performing the service:
      scaling the processing system, the scaling to include:
         where a percentage utilization of a computational resource of the computational resources is exceeded, increasing or decreasing the number of computational resources for performing the service; and
         where a utilization of a computational resource of the computational resources is not exceeded, increasing or decreasing the number of operators of the application for performing the service to create a new set of operators.

2. The method of claim 1, further comprising the processor to redistribute data among the new set of operators, the redistribution comprising:
   associating each operator of the new set of operators with a range of hash values within the consistent set of hash values, wherein the combination of each range of hash values includes all hash values of the consistent set of hash values; and
   moving one or more data objects from a first operator to a second operator where the hash value of the associated key of each of the one or more data objects was associated with the first operator before scaling the processing system and is associated with the second operator after scaling the processing system.

3. The method of claim 1, further comprising storing the data objects in a shared memory pool in the processing system and locating the data objects with memory pointers that signify an address of the data objects stored within the shared memory pool.

4. The method of claim 1, further comprising, analyzing, by the processor, the received application and collocating the operators of the application such that intercommunication cost between the operators is minimized.

5. The method of claim 4, further comprising analyzing, by the processor, the received application by mapping the application as a directed acyclic graph of its operators to identify dependencies of the application operators.

6. The method of claim 5, further comprising minimizing the intercommunication cost between the application operators by placing operators of the application having identified dependencies in in closer physical proximity within memory than operators of the application not interdependent.

7. The method of claim 1, wherein the monitored metric is specific to the processing system, specific to a machine on which the processing system runs, or specific to the application.

8. A processing system comprising:
   a congestion monitor to monitor a metric of the processing system while an application runs;
   a global state manager to distribute data among the operators of the application, the distribution comprising:
      associating each data object with a key and each operator with a range of hash values within a consistent set of hash values, wherein each operator comprises one of a program, a process, or a thread; and
      mapping the data objects to the operators by computing a hash value of each associated key and matching the computed hash value with a hash value within the range of hash values of each operator; and
   a scaling scheduler to scale the processing system where the metric of the processing system surpasses a threshold, the scaling to include:
      where the threshold is a predetermined change in the number of requests for performing the service in the processing system and a percentage utilization of computational resources for processing services of the application is not surpassed, increasing or decreasing the number of operators of the application for performing the service;
the global state manager to, where the metric of the processing system surpasses a threshold:
store data of the application operators;
repartition the data stored in the global state manager according to the increase or decrease in the number of operators of the application, the repartitioning comprising:
associating each operator of the new set of operators with a range of hash values within the consistent set of hash values, wherein the combination of each range of hash values includes all hash values of the consistent set of hash values; and
allocate the repartitioned data to the operators of the application by:
moving one or more data objects from a first operator to a second operator where the hash value of the associated key of each of the one or more data objects was associated with the first operator before scaling the processing system and is associated with the second operator after scaling the processing system,
wherein the computational resources for processing services of the application comprises one or more physical machines, virtual machines, containers, or a combination thereof.

9. The processing system of claim 8, further comprising a topology-aware scheduler to analyze the application and place operators of the application within memory, wherein the placement of the operators by the topology-aware scheduler accounts for dependencies between the operators.

10. The processing system of claim 9, wherein the topology-aware scheduler analyzes the received application by mapping dependencies of application operators as a directed acyclic graph.

11. The processing system of claim 10, wherein the migration of data between operators is minimized by the global state manager assigning a hash value to each operator of the application.

12. The processing system of claim 11, wherein the allocation of data further includes the global state manager to assign a key to each operator of the application.

13. A non-transitory machine-readable storage medium comprising instructions for elastic scaling of a processing system, the instructions executable by a processor to:
monitor a metric of the processing system while an application having a number of operators for performing a service in the processing system runs, wherein the service utilizes computational resources of the processing system comprising one or more physical machines, virtual machines, containers, or a combination thereof;
distribute data objects among the number of operators, the distribution comprising:
associating each data object with a key and each operator with a range of hash values within a consistent set of hash values, wherein each operator comprises one of a program, a process, or a thread; and
mapping the data objects to the operators by computing a hash value of each associated key and matching the computed hash value with a hash value within the range of hash values of each operator;
where the metric of the processing system surpasses a threshold:
store data of the application operators to a global state manager;
scale the processing system, the scaling to include:
where the threshold includes a predetermined change in the number of requests for performing the service in the processing system, increasing or decreasing the number of operators of the application for performing the service;
repartitioning the data stored in the global state manager according to the change in the number of operators of the application, the repartitioning comprising:
associating each operator of the new set of operators with a range of hash values within the consistent set of hash values, wherein the combination of each range of hash values includes all hash values of the consistent set of hash values; and
allocating the repartitioned data to the operators of the application by:
moving one or more data objects from a first operator to a second operator where the hash value of the associated key of each of the one or more data objects was associated with the first operator before scaling the processing system and is associated with the second operator after scaling the processing system.

14. The non-transitory machine-readable storage medium of claim 13, further comprising instructions to increase or decrease the number of computational resources for performing the service where the threshold includes a percentage utilization of computational resources for processing services of the application.

15. The non-transitory machine-readable storage medium of claim 13, wherein the number of operators of the application for performing the service is increased where the threshold is a predetermined change in the number of requests for performing the service in the processing system and a percentage utilization of computational resources for processing services of the application is not surpassed.

16. The non-transitory machine-readable storage medium of claim 13, wherein the number of operators of the application for performing the service is decreased where the threshold is a predetermined change in the number of requests for performing the service in the processing system and a percentage utilization of computational resources for processing services of the application is not surpassed.

17. The non-transitory machine-readable storage medium of claim 13, wherein the monitored metric is specific to the processing system, specific to a machine on which the processing system runs, or specific to the application.

* * * * *